United States Patent
Lamm et al.

(12) 
(10) Patent No.: US 6,315,355 B1
(45) Date of Patent: Nov. 13, 2001

(54) METHOD AND APPARATUS FOR TRIGGERING A SLIDING AND HINGED SUN ROOF

(75) Inventors: Hubert Lamm, Kappelrodeck; Guenter Haderer, Buehl, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,702

(22) PCT Filed: Jan. 29, 1999

(86) PCT No.: PCT/DE99/00225

§ 371 Date: Feb. 23, 2000

§ 102(e) Date: Feb. 23, 2000

(87) PCT Pub. No.: WO99/53589

PCT Pub. Date: Oct. 21, 1999

(30) Foreign Application Priority Data

Apr. 9, 1998 (DE) .............................................. 198 15 960

(51) Int. Cl.⁷ ..................................................... B60J 7/057
(52) U.S. Cl. .................................. 296/213; 296/223; 49/28
(58) Field of Search .................................... 296/213, 223; 49/26, 28

(56) References Cited

U.S. PATENT DOCUMENTS 5,592,060 * 1/1997 Racine et al. ...................... 49/27 X

FOREIGN PATENT DOCUMENTS 27 56 972   6/1979   (DE) .
30 34 118 C2   12/1983   (DE) .

* cited by examiner

Primary Examiner—Dennis H. Pedder
(74) Attorney, Agent, or Firm—Michael J. Striker

(57) ABSTRACT

Proposed are a method and an apparatus for controlling a sliding and lifting sunroof device, which has a protection against wedging during closing of the cover (12) of the sliding and lifting sunroof from its raised position to its closed position, and which detects a situation of wedging of an object (20) wedged between the cover (12) and the opening of the sliding and lifting sunroof with the help of a sensor (34). Furthermore, for detecting a situation of wedging, provision is made for a water duct (18), which is movably arranged on the roof (14) of the motor vehicle within the opening of the sliding and lifting sunroof.

9 Claims, 1 Drawing Sheet

METHOD AND APPARATUS FOR TRIGGERING A SLIDING AND HINGED SUN ROOF

PRIOR ART

Figure 1A:
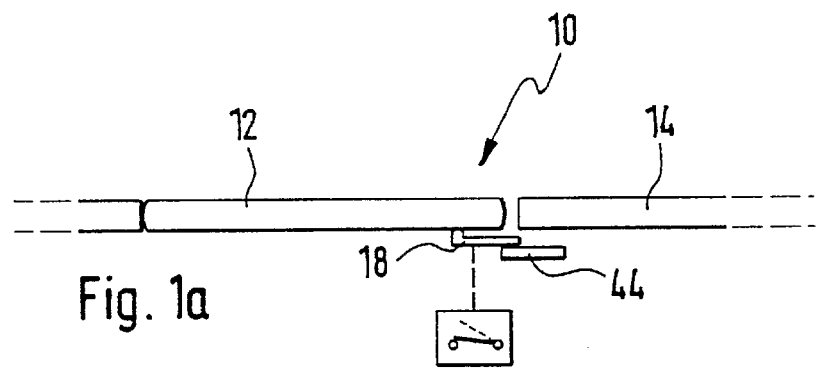

The invention starts out from a method and an apparatus as defined in the introductory parts of the main claims.

A method for electronically monitoring the opening and closing operations of electrically operated window regulators and sliding roofs in motor vehicles is known from DE PS 30 34 118. In fixed zones of the path along which the moved part has to travel in the course of the opening and closing operation, the electric motor of the drive is switched off as soon as a blocking situation occurs, which is detected by monitoring the number of revolutions of the drive, and a time limit is reached. A means of protection against wedging or jamming is realized in another zone in that in the course of the closing operation, measured values depending on the number of revolutions and on the speed of the moving part or drive motor are continuously collected and compared with a limit value based on a value measured initially, and if such limit value is exceeded, the driving direction of the electric motor is briefly reversed and the drive is then switched off.

However, realization of the protection against wedging or jamming via monitoring and evaluation of the number of revolutions or speed is not possible in connection with a sliding and lifting sunroof when the sliding and lifting roof is lowered from its raised into its closed position because with a moving motor vehicle, high driving speeds generate a vacuum above the raised or open cover. Such vacuum counteracts the closing movement of the cover and thus leads to a reduction of the detected number of revolutions and faulty triggering of the protection against wedging. Furthermore, low stiffness of the roof of the motor vehicle increases the effects of the forces engaging the cover as well.

Sliding roofs with protection against wedging or jamming are known from DE-OS 27 56 972, which measure and evaluate the motor current for detecting a wedging situation within the sliding zone of the cover. However, for the reasons stated above, this type of protection against wedging cannot either be employed in the lifting zone of the sliding and lifting sunroof.

Other devices known in the market as means for protection against wedging, for example such as light barriers or pressure sensors in the opening zone of the sliding roof, are difficult to install in the seal of the cover, or in the opening of the sliding roof because of the geometry of the roof.

ADVANTAGES OF THE INVENTION

The method and the apparatus as defined by the invention, with the characterizing features of the main claims, offer the advantage that a means of protection against wedging is realized for a sliding and lifting sunroof during closing of the latter from its raised to its closed position in that a wedging situation involving an object wedged between the cover of the sliding and lifting sunroof and the opening of the latter is detected by a sensor.

According to the invention, provision is made, furthermore, that for detecting a situation of wedging, use is made of a water duct, which is movably arranged on the edge of the roof of the motor vehicle within the opening of the sliding and lifting sunroof. The water duct prevents water present on the roof of the vehicle from getting into the interior of the car through the opening of the sliding and lifting roof, for example when the vehicle is accelerated.

The measures specified in the dependent claims result in advantageous further developments and improvements of the features stated in the main claim.

It is particularly advantageous that the water duct is arranged via a pivot and a spring device in the rear part of the opening of the sliding and lifting sunroof, for example on a movable guide part of the sliding and lifting sunroof, such guide part permitting the cover to be opened and moved into a sliding position, so that the water duct, on the one hand, either assumes an unstressed condition, or a resting position when the cover is open, or, on the other hand, it is depressed and stressed into a loaded condition depending on the force acting on the water duct and is finally brought into a closing position when the sunroof is closed.

In a case of wedging, the object wedged between the cover of the sliding and lifting sunroof and the water duct is pressed against the latter by the lowering movement of the cover, so that the water duct is brought into its closing position as the clamping force progresses. The closing position, a previously reached clamping or wedging position, or a movement of the water duct are advantageously detected by a sensor, which generates a sensor signal for a control. Such control evaluates the sensor signal in view of a wedging situation or a normal closing operation of the cover of the sliding and lifting sunroof.

It is advantageous, furthermore, that the sensor is realized in the form of a switch, which detects the closing or clamping position of the water duct and thus a preset position corresponding with the effect exerted by a previously known adjusting or wedging force on the water duct. Furthermore, it is advantageous that the sensor is designed in the form of an angular sensor, so that not only the closing or wedged position of the water duct is detected, but the rotational motion of the water duct, for example from the resting into the closing position is continually or partly continually monitored as well. A rotational movement of the water duct around its fastening on the roof is already detected in this way, depending on the wedging force exerted on the wedged object by the cover of the sliding and lifting sunroof, so that a sensor signal is generated as a function of the increasing adjusting or wedging force via the angle of deflection of the water duct. This assures a particularly safe and rapidly responding protection against wedging.

Furthermore, it is particularly advantageous that the sensor signals are evaluated in the control. The movement of the sliding and lifting sunroof is usually regulated via position control circuit, or via a simple controlling means. For example, with a position control circuit, the adjusting movement of the sliding and lifting sunroof, such movement being initiated by presetting a new nominal value, is detected by position sensors, which are known per se, for example Hall sensors or absolute value devices, and supplied to the controller for determining the actual position of the sliding and lifting sunroof. An actual value/nominal value comparison is carried out in the controller, and the adjusting movement is controlled in the latter. Based on the actual position of the sliding and lifting sunroof and the sensor signal, the controller determines whether a normal closing process or a wedging situation is on hand.

It is particularly advantageous, furthermore, that by evaluating the sensor signal in the controller, direct limitation of the closing force is realized in a way not subjected to the interfering influence of wind load, i.e. vacuum at high speeds of the motor vehicle, or to the characteristic of the spring or elasticity rate of the overall system of the sliding and lifting sunroof.

DRAWING

Exemplified embodiments of the invention are shown in the drawing and explained in greater detail in the following description.

Figure 1B:
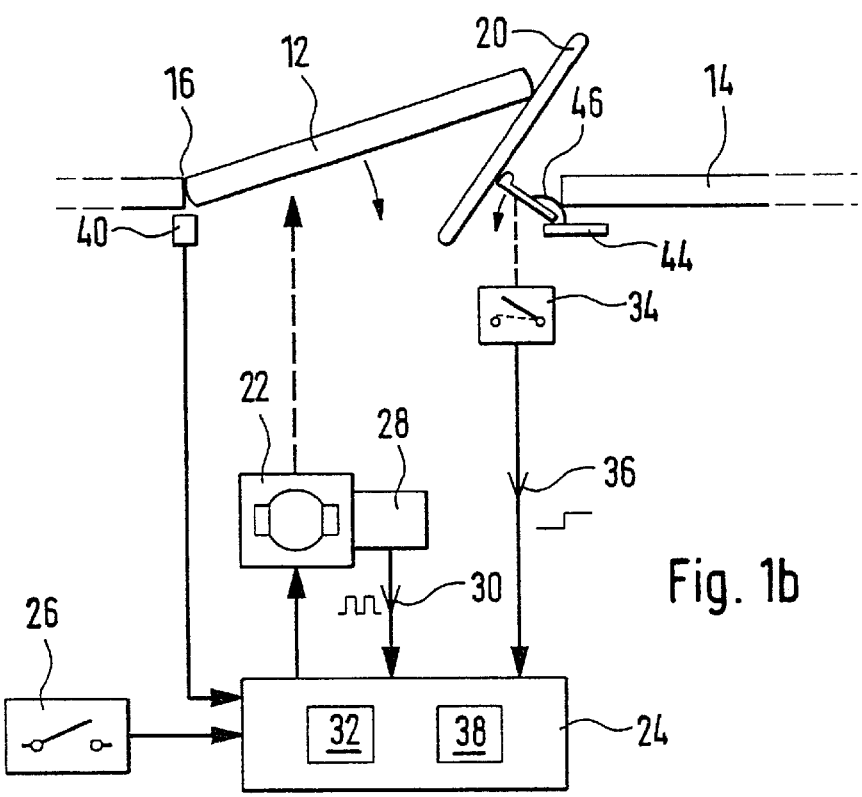
Figure 2:
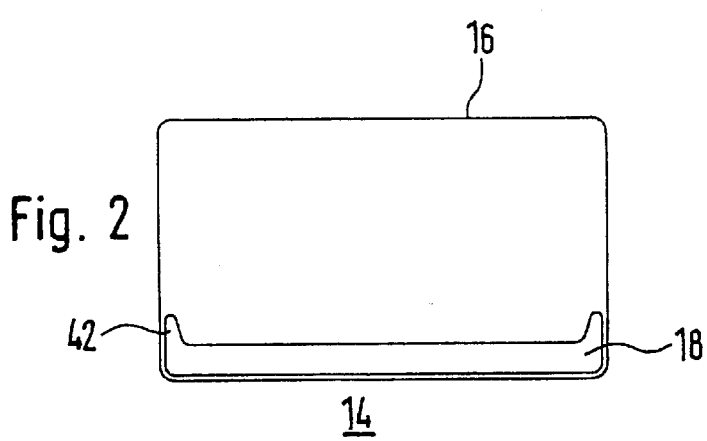

FIG. 1 shows a preferred exemplified embodiment of the device as defined by the invention, with a sliding and lifting sunroof shown by a sectional view, and FIG. 2 shows a top view of the sliding and lifting sunroof.

DESCRIPTION OF THE EXEMPLIFIED EMBODIMENT

FIG. 1 shows a sliding sunroof 10 for a motor vehicle, with a sliding sunroof cover 12 closing an opening in a motor vehicle roof 14. The sliding sunroof cover 12 is mounted via a link guide (not shown) on the motor vehicle in such a way that the sunroof cover 12 can be raised via a pivot 16 into a lifted position (FIG. 1b), or controlled via a closed position (FIG. 1a) into a sliding position. The control system is realized here in the form of a position control circuit.

For catching any water that may have collected on the roof 14, a water duct 18 is rotatably arranged on a displaceable guide part 44 on the side of the opening of the sliding and lifting sunroof opposing the pivot 16. Said water duct can be tensioned by at least one coil spring 46 as the spring device, the latter being located at a site where the water duct 18 is secured on the guide part 44. By the closed cover 12 of the sliding and lifting sunroof, the water duct 18 is pressed into a closing position according to FIG. 1a.

When the cover 12 of the sliding and lifting sunroof is lifted into its raised position, the water duct 18 changes into a relieved resting position. Alternatively, it is possible also to make provision for a stop for the resting position of the water duct 18, so that the latter is prestressed when located in its resting position.

When the sunroof 10 is open, an object 20 may get into the opening between the water duct 18, or roof 14, and the cover 12 of the sliding and lifting sunroof. Such object 20 is, for example a bar or pole, a body part such as, for example a finger or an arm, or any other object 20 that may get wedged in.

The sunroof cover 12 is controlled into a raised, sliding or closed position by a reversible electric motor 22 via a gearing (not shown) equipped, for example with a link-type guide. The motor 22 is controlled directly via a control 24, and indirectly via a control switch 26 operated by the user for presetting the position or the nominal value of the cover 12 of the sliding and lifting sunroof. The control switch 26 is preferably a potentiometer and/or a toggle switch, with which the driver of the motor vehicle adjusts discrete nominal positions of the sliding and lifting sunroof either continuously or by means of click stops.

Associated with the motor is a position sensor 28, preferably a Hall sensor, which operates together with one or a plurality of ring magnets located on the armature shaft of the motor 22, and which transmits Hall sensor signals 30 as a function of the rotation of the armature shaft. The Hall sensor signals 30 are supplied to the control 24 via an interrupt input and counted via a counter 32 located in said input. The counter reading indicates the position of the cover of the sliding and lifting sunroof within its path of adjustment. The closed position of the cover of the sliding and lifting sunroof therefore can be determined via the reading of counter 32 as well. For standardizing the counter 32, the cover 12 of the sliding and lifting sunroof is displaced or driven into a mechanical stop. This is recognized by the control 24 and the counter 32 is reset accordingly. Alternatively, however, the closed position of the cover 12 can be detected by a microswitch 40, or such a switch can be employed for standardization. According to the invention, a switch in the form of a sensor detecting a closed position when the sunroof is closed, or a clamped or wedged position of the water duct 18 located between the resting and the closing positions, supplies the control 24 with an appropriate switch signal 36.

For the evaluation of said switch signal 36, the control 24 has a comparator 38 which compares the switch signal 36 with the detected actual position.

FIG. 2 shows a top view of the sliding and lifting sunroof 10 according to FIG. 1, but without the cover 12. Shown are the opening for the sliding and lifting sunroof in the roof 14 of the motor vehicle, and the water duct 18 mounted on the side of the opening opposite the pivot 16.

The method as defined by the invention is now described in light of FIG. 1.

The motion and the direction of rotation of the motor armature shaft are detected with the Hall sensor 28 and supplied to the control 24. Corresponding with the rotation of the shaft of the motor armature, the cover 12 is driven into its lifting or into a sliding position. Therefore, it is possible in this way to determine via the Hall sensor signals 30 and the counter 32 the actual position, speed and direction of movement of the cover 12. A value of the counter 32 is consequently associated with or allocated to each position of the cover 12 over the entire distance of displacement, said counter counting the interrupts upwardly or downwardly depending on the direction of rotation. Via a mechanical stop of the cover 12, the counter 32 is set to a predetermined or preset value, for example to zero.

The range of adjustment of the cover 12 is continually detectable in this way and the actual position of the cover 12 is known. The sliding range and the lifting range of the sunroof cover 12 may be differentiated with the help of the value counted by the counter 32.

The protection against wedging described in the following is effective when the cover 12 is driven from its raised position into its closed position. For this purpose, the control 24 controls the motor 22 depending on the Hall sensor signals 30 of the Hall sensor 28, and the signals supplied by the control switch 26. A position control circuit is consequently realized in this way.

Legal standards such as, for example the US test standard "FMVSS118", or the German "Richtlinien fuer fremdkraftbetaetigte Fenster in PKW" [Guidelines for Passenger Car Windows operated by Separate Power] specify, for example, that no forces higher than 100 N may act on an object 20 wedged between the cover 12 and the water duct 18. With a sliding sunroof 10 without protection against wedging, said wedging forces would be significantly exceeded in a case of wedging. Detection of a wedged object as defined by the invention, and the limitation of the closing forces of cover 12, for example to below 100 Newton, take place via the switch 34 and the control 24. In such a wedging situation, the adjusting force or the adjusting torque applied by the motor 22 to the wedged object 20 via the cover 12 is transmitted to the movably supported water duct 18, so that the latter is lowered with increasingly effective force from the resting position into a clamping position. Each position of the water duct 18 corresponds with a known clamping force acting on said duct. Since the clamping position is detected by the switch 34, the switch signal 36 characterizes the action of said known force on the object 20. For example, the switch 34 generates a switch signal 36 when the adjusting force of cover 12 exerts on the object 20 or the water duct 18 the value of 80 Newton.

In the comparator 38, the control 24 carries out a comparison of the actual position of the cover 12 with the switch signal 36 to detect whether the switch signal 36 coincides with the closed position of the cover according to FIG. 1*a*, or with a raised position of the cover 12 according to FIG. 1*b*. In the latter case, the control 24 induces stopping or reversal of the rotational direction of motor 22 in order to keep the wedging forces low, or to release again the wedged object 20.

The comparison of the actual position of the cover 12 with the switch signal 36 also permits detection of the thickness of the wedged object 20, so that in the control 24, the permissible wedging forces have to be fixed as a function of the thickness. For example, pursuant to US safety standard FMVSS118, a wedging force of maximally 100 Newton is permissible with a thickness of from 4 mm to 200 mm of the wedged object 20. Furthermore, according to FMVSS118, the spring constant of the test object 20 to be wedged is fixed depending on its thickness: at least 65 Newton/mm for a diameter of 25 mm or less; at least 20 Newton/mm for a diameter of more than 25 mm. The spring constant therefore specifies a value for the hardness of the wedged object 20.

So as to comply with legal provisions, the protection against wedging and the limitation of the closing force are adjusted for hard and soft objects 20 via the spring constant of the spring means 46, on the one hand, and thus via the absorption of force when the water duct 18 is deflected from the resting position, or, on the other hand, via the position of the clamping detected by the switch 34 i.e. a switch signal 36 can be generated already in the presence of a minor, or only in the presence of a major deflection of the water duct 18. The function or dependence of both quantities and their optimal adjustment can be determined by experimentation, and set for each motor vehicle model.

With a soft spring constant of the spring, or high uptake of force per displacement of water duct 18, wedging situations involving hard objects 20 (high spring constant), in which the wedging forces build up rapidly, can be detected as well in a safe and rapid manner in compliance with the legal prescriptions.

The design of the water duct 18 can be optimized for the method as defined by the invention according to FIG. 2. With a rectangular opening of the sliding sunroof, for example, the water duct 18 has to be extended in its longitudinal direction along the edge of the roof, resulting on the attachments 42. With such attachments it is possible for the protection against wedging to cover at least partially also the zones where the cover 12 "yaws" with the roof 14. Furthermore, the width of the water duct 18 or its resting position can be varied and optimized in accordance with the requirements.

In an enhanced exemplified embodiment, an angle sensor 34, a rotary potentiometer or a switch bar is employed instead of a switch. Such an element detects not only a closing or clamping position of the water duct 18, but continually or partly continually or step by step detects also the rotational motion of the water duct 18 around its fastening on roof 14. This means that a continuous signal is transmitted over a longer path to the control 24 and evaluated even before a maximum wedging force has been reached. Preferably, the change in force, i.e. the change in displacement per time interval is used for the evaluation, such change in displacement being compared with a limit value selected correspondingly. Since this provides for a longer observation time, the control can be finely tuned to the wedging situation, so that it is possible to respond or react to a wedging situation in an optimized way. In particular, different spring constants of the wedged objects 20 can be considered through different evaluations of the sensor signal 36.

In another exemplified embodiment, standardization of the sliding and lifting sunroof 10 via the adjustment range and via resetting of counter 32 is accomplished by a microswitch 40 as the reference switch which, for example in the course of passage of the cover 12 from its raised position via the closed position into its sliding position, generates a signal change, whereby the zero passage of the level change is allocated to the closed position of cover 12.

The invention is not limited to a water duct 18, but comprises similarly arranged movable shutters, strips, metal sheets or the like, which are employed in connection with sliding and lifting sunroofs, lifting roofs, folding roofs or side vents that have to be adjusted from an open-position to a closed position. For example, for closing a folding roof, a shutter has to be arranged above the windshield, such shutter cooperating with the folding roof in the closing operation, so that the protection against wedging as defined by the invention can be realized.

What is claimed is:

1. A method for controlling a sliding and lifting sunroof device of a motor vehicle, with a control (24) for controlling a reversible drive (22), whereby a movable element (18) is movably arranged on a side of an opening of the sliding and lifting sunroof, characterized in that when the cover (12) of the sliding and lifting sunroof is lowered by the drive (22) from its open, raised position into its closed position, a wedging of an object (20) between the cover (12) of the sliding and lifting sunroof and the opening of the latter is detected by the control (24) in that the movable element (18) is deflected by the wedged object (20) from its resting position, and said deflection is detected by a sensor (34), the latter transmitting a sensor signal (36) to the control (24), and the movable element (18) is a water duct.

2. The method according to claim 1, characterized in that the sensor (34) formed as a switch detects a fixable value of deflection of the moveable element (18), in a clamping position or a closing position.

3. The method according to claim 1, characterized in that the deflection of the movable element (18) is detected by the sensor (34), formed as an element selected from the group consisting of an angle sensor and a switch bar continuously, partly continuously or step by step over a range of displacement of the movable element (18), and that a sensor signal (36) depending on the magnitude of deflection is transmitted to the control (24).

4. The method according to claim 1, characterized in that the drive (22) is stopped and/or reversed by the control (24) depending on the sensor signal (36) characterizing the deflection of the moveable element (18), so that the adjustment movement of the cover (12) of the sliding and lifting sunroof is stopped or the cover (12) is opened again.

5. The method according to claim 1, characterized in that the control (24) carries out a determination of the actual position value of the cover (12) of the sliding and lifting sunroof, such actual value being detectable through an actual position value acquisition (28), with the sensor signal (36), and that a wedging situation or a closed condition of the cover (12) of the sliding and lifting sunroof is recognized by the control (24) depending on the result of the determination.

6. The method according to claim 1, characterized in that a comparison of the actual position value of the cover (12) of the sliding and lifting sunroof, said actual position value being detectable through an actual position value acquisition (28), with the sensor signal (36) is carried out by the control (24), and that in the event of a situation of wedging, the thickness of the wedged object (20) is determined and the maximally permissible wedging force is fixed by the control (24) depending on the thickness.

7. A device for controlling a sliding and lifting sunroof device of a motor vehicle, with a control (24) for controlling a reversible drive (22), whereby a movable element (18) is movably arranged on a side of the opening of the sliding and lifting sunroof, characterized in that the movable element (18) is deflectable from a resting position by an object (20) wedged between the cover (12) of the sliding and lifting sunroof, and the opening of the latter, and that a sensor (34) detects the deflection of the movable element (18) and transmits a sensor signal (36) to the control (24) for realizing a protection against wedging, and the movable element (18) is a water duct.

8. The device according to claim 7, characterized in that the sensor is formed as at least one switch selected from the group consisting of a switch bar and an angle sensor.

9. The device according to claim 7, wherein the movable element is arranged on a side of an opening of a sliding and lifting sunroof, which is opposite to a pivot (16) of the sliding and lifting sunroof.

* * * * *